United States Patent
Pannu

(10) Patent No.: US 6,735,741 B1
(45) Date of Patent: May 11, 2004

(54) METHOD SYSTEM, AND PROGRAM FOR DYNAMIC RESOURCE LINKING WHEN COPIES ARE MAINTAINED AT DIFFERENT STORAGE LOCATIONS

(75) Inventor: Jatinder Singh Pannu, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,680

(22) Filed: Jul. 30, 1999

(51) Int. Cl.[7] ................. G06F 15/00; G06F 17/00
(52) U.S. Cl. ............ 715/530; 715/501.1; 709/200; 709/201; 709/203; 709/217; 709/218; 709/219; 709/229; 709/238; 707/1; 707/10
(58) Field of Search .............. 715/501.1, 530; 709/200, 201, 203, 217, 218, 219, 229, 238; 707/1, 10

(56) References Cited

U.S. PATENT DOCUMENTS

| | | | |
|---|---|---|---|
| 5,412,806 A | 5/1995 | Du et al. ............... 707/2 |
| 5,742,598 A * | 4/1998 | Dunn et al. ............ 370/393 |
| 5,751,961 A | 5/1998 | Smyk .................... 709/217 |
| 5,765,171 A * | 6/1998 | Gehani et al. .......... 707/203 |
| 5,802,265 A | 9/1998 | Bressoud et al. ........ 714/11 |
| 6,223,209 B1 * | 4/2001 | Watson ................. 709/201 |
| 6,304,913 B1 * | 10/2001 | Rune .................... 709/241 |
| 6,389,462 B1 * | 5/2002 | Cohen et al. ........... 709/218 |

* cited by examiner

*Primary Examiner*—Joseph H. Feild
*Assistant Examiner*—Almari Yuan
(74) *Attorney, Agent, or Firm*—David W. Victor; Konrad, Raynes & Victor LLP

(57) ABSTRACT

Disclosed is a system, method, and program for linking to data from a document that includes a pointer to the data in a first storage device, which may be maintained in a network file server. A first request to access the data addressed by the pointer in the document is processed. Information on alternate storage devices, such as alternate file servers in the network, and data therein is processed to determine whether a copy of the data is present in a second storage device. A second request is submitted to access the copy of the data in the second storage device after determining that the information indicates that the second storage device includes the data. The accessed copy of the data, received in response to the second request, is then returned to the first request.

33 Claims, 4 Drawing Sheets

METHOD SYSTEM, AND PROGRAM FOR DYNAMIC RESOURCE LINKING WHEN COPIES ARE MAINTAINED AT DIFFERENT STORAGE LOCATIONS

BACKGROUND OF THE INVENTION

1. Field of the Invention

The present invention relates to a method, system, and program for dynamically linking to data when copies are maintained at different storage locations and, in network environments, linking to an alternate server including a copy of the data.

2. Description of the Related Art

In a client/server network environment, data is distributed at different storage locations. Users accessing files or database records will use a fixed file path name to access the data. There are many software techniques used in the art for allowing users to access or link to a document at a distributed location, such as a file server. In the Internet context, a hypertext link may be embedded in a Hypertext Markup Language (HTML) document that provides a Universal Resource Locator (URL) of the linked document, which is the global address of a document on the World Wide Web. The document may then be retrieved via this hypertext link that uses the address of the document on a server connected to the Internet or World Wide Web. For instance, an HTML page may include hypertext links to other HTML pages of interest.

Further, most WINDOWS applications enable object linking and embedding (OLE) between applications and between documents. Hyptertext linking and embedding is used as a method of sharing data between documents. This allows immediate access to the current version of the linked embedded document. For instance, in the LOTUS NOTES** environment, a document or an e-mail message may contain a document link (doclink) to another document stored at a location in the network. With Lotus Notes, links can be created to documents, views, and databases. Links appear as a graphical representation or icon of a piece of paper with a corner folded down. Associated with each link is a location, called the link pointer, within the link document. When the user double-clicks the link, Lotus Notes displays the link document showing the section of text containing the link pointer. When the user closes the link document, Lotus Notes returns to the original document that contained the link. These links or icons representing the links may be included in e-mails or any other Lotus Notes documents.

The links created in HTML pages, Lotus Notes, and other systems are static links. If the database ID or document ID referenced in the link is available at a different location, then another hypertext link to the new location of the document will have to be created to address the file or data at this new location.

In network systems, especially those distributed world wide, data may be replicated at different server locations. Lotus Notes allows multiple copies of a single file, called replicas, on multiple servers or workstations. This allows users at dispersed locations to access the same data from a local file server. A replica differs from a copy of a file, in that the original file and its replica have the same replica ID number. Replication is the process of sharing changes between replicas. Lotus Notes applies updates to the master copy of the data to the replicas to insure consistency between the replicas and the master copy of the data.

Although replicas of databases may be maintained, when a user activates a link, the linked document is accessed at the server initially specified when the link is created as document addressed by the link is static. i.e., points to the same document. Thus, even if the data is at a more proximate replicated location, the link will access the data at the server initially specified and ignore the presence of the data at a more proximate replica location.

There is thus a need in the art for an improved method, system, and program for providing links to data within documents.

SUMMARY OF THE PREFERRED EMBODIMENTS

To overcome the limitations in the prior art described above, preferred embodiments disclose a system, method, and program for linking to data from a document that includes a pointer to the data in a first storage device. A first request to access the data addressed by the pointer in the document is processed. Information on alternate storage devices and data therein is processed to determine whether a copy of the data is present in a second storage device. A second request is submitted to access the copy of the data in the second storage device after determining that the information indicates that the second storage device includes the data. The accessed copy of the data, received in response to the second request, is then returned to the first request.

In further embodiments, the document is opened and a user selectable graphical representation of the pointer to the data in the opened document is displayed. In such case, the first request is generated in response to user selection of the graphical representation of the pointer to the data.

In network embodiments, a first computer includes the document including a pointer to data at a second computer. A first request is processed to access the data addressed by the pointer in the document. Information on alternate computers and data therein is processed to determine whether a copy of the data is present in a third computer. The first, second, and third computers communicate over a network. A second request is submitted to the third computer for the copy of the data after determining that the third computer maintains the copy of the data. The accessed copy of the data, received in response to the second request, is returned to the first request.

In further network embodiments, the data is included in a database. The information on alternate computers indicates different domains, servers included in each domain, and at least one database included in each server. In such case, a determination is made of a domain indicated in the information having the same domain as the first computer. A determination is then made as to whether one server in the determined domain that includes a copy of the database including the copy of the data addressed by the pointer in the document. In such case, submitting the second request comprises submitting the second request to the determined server including the copy of the database.

In still further network embodiments, location information may be provided on the location of the alternate computers to allow the selection of a server including the copy of the database that is at the most proximate location to the first computer.

In further embodiments, the information on alternate storage devices and servers may be maintained in the document including the pointer to the data.

Preferred embodiments provide a mechanism for allowing the automatic selection of an alternate location to access data embedded in a document different from the address specified by the link. Typically, when an embedded link to data within a document is processed, the link is static and the same address specified by the link is accessed to retrieve the data. Preferred embodiments provide information that may be used to access the data at a more proximate storage device or network server than the location specified in the link. This provides dynamic smart linking to the closest location that includes the linked data. This invention is especially useful in network environments where data is replicated at servers in dispersed geographical locations. In such environments, the preferred embodiments will automatically access data addressed in a link within a document, such as a hypertext link, from the most proximate geographical location.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 1:
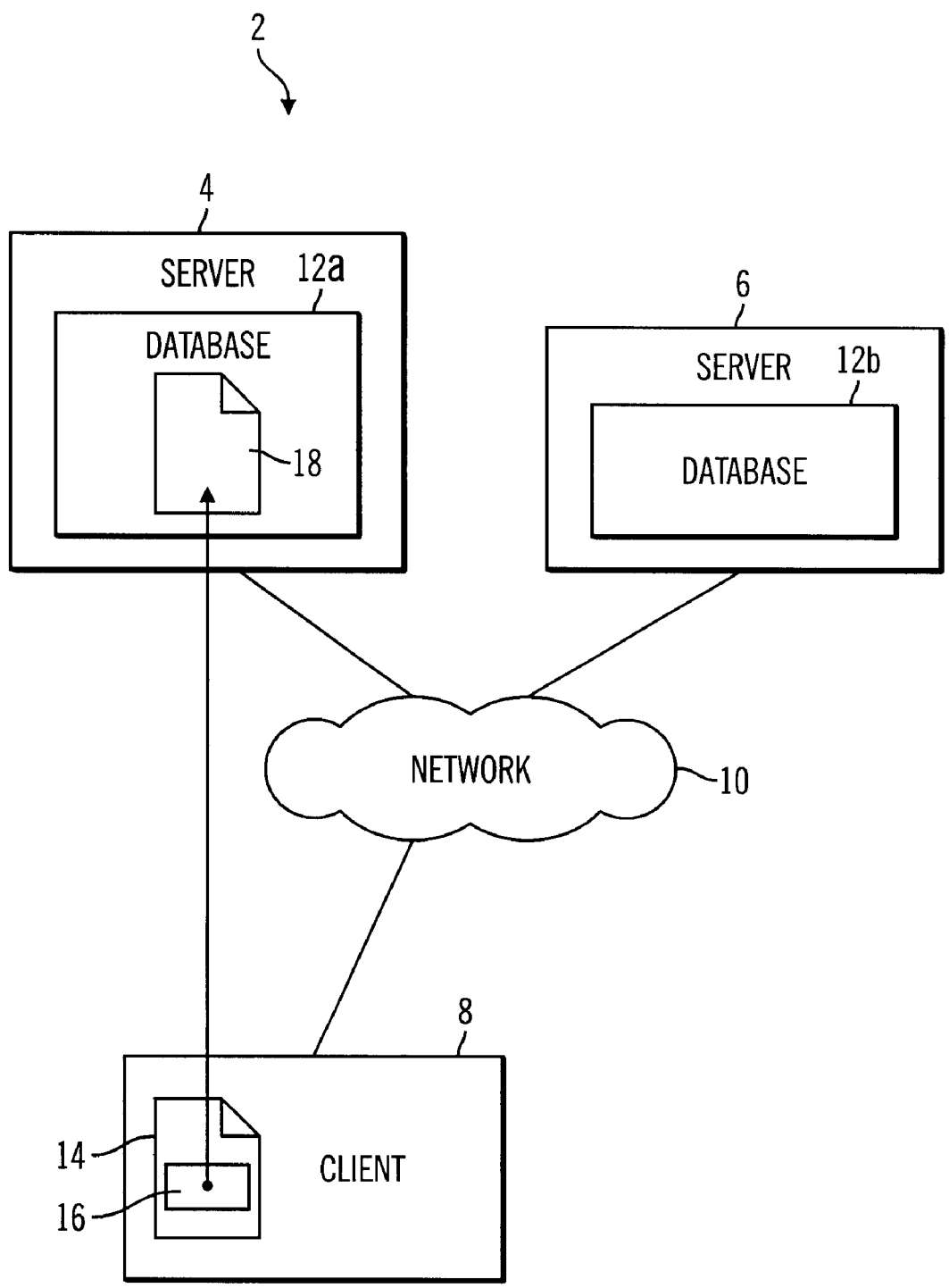
FIG. 1 illustrates a computing environment in which preferred embodiments in accordance with the present invention are implemented.

FIG. 1 illustrates a hardware and software environment in which preferred embodiments are implemented. A computing environment 2 comprises servers 4 and 6, a client computer 8, and a network 10 providing communication there between. The servers 4 and 6 may be any server device known in the art capable of servicing network and e-mail requests, e.g., IBM NETFINITY, AS/400, RS/6000, etc. The client 8 may be comprised of any computing device known in the art that is capable of accessing and retrieving information from a network. In preferred embodiments, the servers 4, 6 include messaging, application, and data server software, such as the LOTUS DOMINO software, to provide messaging, such as e-mail messages, application programs, and data to one or more clients 8. The client 8 would include client software capable of interfacing with the servers 4, 6, such as the LOTUS NOTES** software, which provides users a graphical user interface (GUI) to access the data from the servers 4, 6, and databases 12a and 12b in the servers 4 and 6. Further details of the Lotus server and client architecture are described in the publication "Lotus Domino Release 5.0:A Developer's Handbook," IBM document no. SG24-5331-00 (Copyright IBM Corp., January 1999), which publication is incorporated herein by reference in its entirety.

The network 10 may be a TCP/IP network, such as an Intranet, the Internet, World Wide Web, or any other network system known in the art, e.g., LAN, Ethernet, WAN, System Area Network (SAN), Token Ring, LocalTalk, TCP/IP, the Internet, etc. Alternatively, there may be separate and different networks between the servers 4 and 6 and client 8.

The servers 4 and 6 further include a storage area, e.g., hard disk drive, tape drive, cache, etc., to store files, databases, and any other applications and data objects. The servers 4 and 6 include databases 12a and 12b, respectively. In preferred embodiments, database 12b in server 6 is a replica of the database 12a in server 4. In the Lotus Notes environment, a database replica is an exact copy of a database. Multiple replicas of a single database may be maintained on multiple servers. By using distributed replicas, users can access the same information on different networks, in different time zones, or even in different countries, without having to access one centrally located database. A database replica and the original database share the same replica ID, a unique number assigned to each database. During replication, a database on one server transfers any new, edited, or deleted documents and design elements to a database on another server or workstation. Data can be transferred from one server to another, back and forth between servers, or between a server and workstation. Because replication is incremental, transferring only changes to a database, the amount of network traffic and server time involved in synchronizing databases is minimized. Replication automatically distributes and synchronizes information and applications across geographically dispersed sites. In preferred embodiments, servers 4 and 6 are in geographically dispersed sites. Thus, database 12b provides a mirror replication of the data in database 12a at a different geographical location to make the data available to users at the different geographical location.

Linking to Documents

The client 8 accesses a document 14, which may be a form, e-mail message, or any other type of document maintained locally or received from another system in the network 10. The document 14 includes an embedded link 16 that addresses a document 18 in database 12a in server 4. The document 18 may be a file, such as a text, image, sound file, motion picture, etc., or a portion of a database, thereby providing a view into certain database records. This link 16 may be in the form of a hypertext link, including the URL address of the document 18 or a Lotus Notes Doculink. The link 16 may be a graphically displayed link, such as the HTML hypertext link or the Lotus Notes doculink, or an embedded link that is not displayed and accesses the document 18 when the document 14 is opened. In the Lotus Notes environment, the form or document 14 includes fields of information on the document 18 to allow a script program executed in response to selection of the link 16 to access and display the document 18 from document 14. These fields embedded into the document 14, described below, are not displayed, but used to access the document 18 to display within document 14:

Document Server—indicates the server that includes the linked document 18.

Document Database—indicates the database that includes the linked document 18.

Document ID—the uniquely referenced information object within the database, i.e., the document 18.

Domains—provides a list of domains available in the network 10. A domain is a collection of servers and clients/users that share a common directory. The primary function is mail routing. Users' domains are determined by the location of their server-based mail files.

Locations—provides geographical locations within each of the domains indicated in the Domains field. The location name field may further include a short or abbreviated form of the name.

Data Servers—indicates the servers included in each of the locations of each of the domains indicated in the Domains and Locations fields.

Data Bases—indicates the databases included in each of the servers indicated in the Data Servers' field.

Default Domain—indicates the domain of the master database including the linked-to document 18. In systems with one or more replica servers, the Default Domain field indicates the domain of the master server from which the replica servers are derived. The Default Domain field may include a short or abbreviated form of the domain name.

Default Data Server—indicates the master server, e.g., server 4, within the master or default domain, from which the replica servers, e.g., server 6, are generated.

Default Database—indicates the master database, e.g., database 12*a*, within the master or default domain, from which the replica databases, e.g., database 12*b*, are generated.

The Document Server, Document Database, and Document ID fields include the information to address the document addressed by the link 16, including server, database, and unique document ID of the document 18 for which the link was created. This information is used to access the document 18 from document 14. Users may execute the link 16 by selecting an icon, which in Lotus Notes is a graphical page or button, that causes execution of a script program that processes the information in the Document Server, Document Database, and Document ID fields in the document 16 to access the document 18 for display at the client 8.

Figure 2:
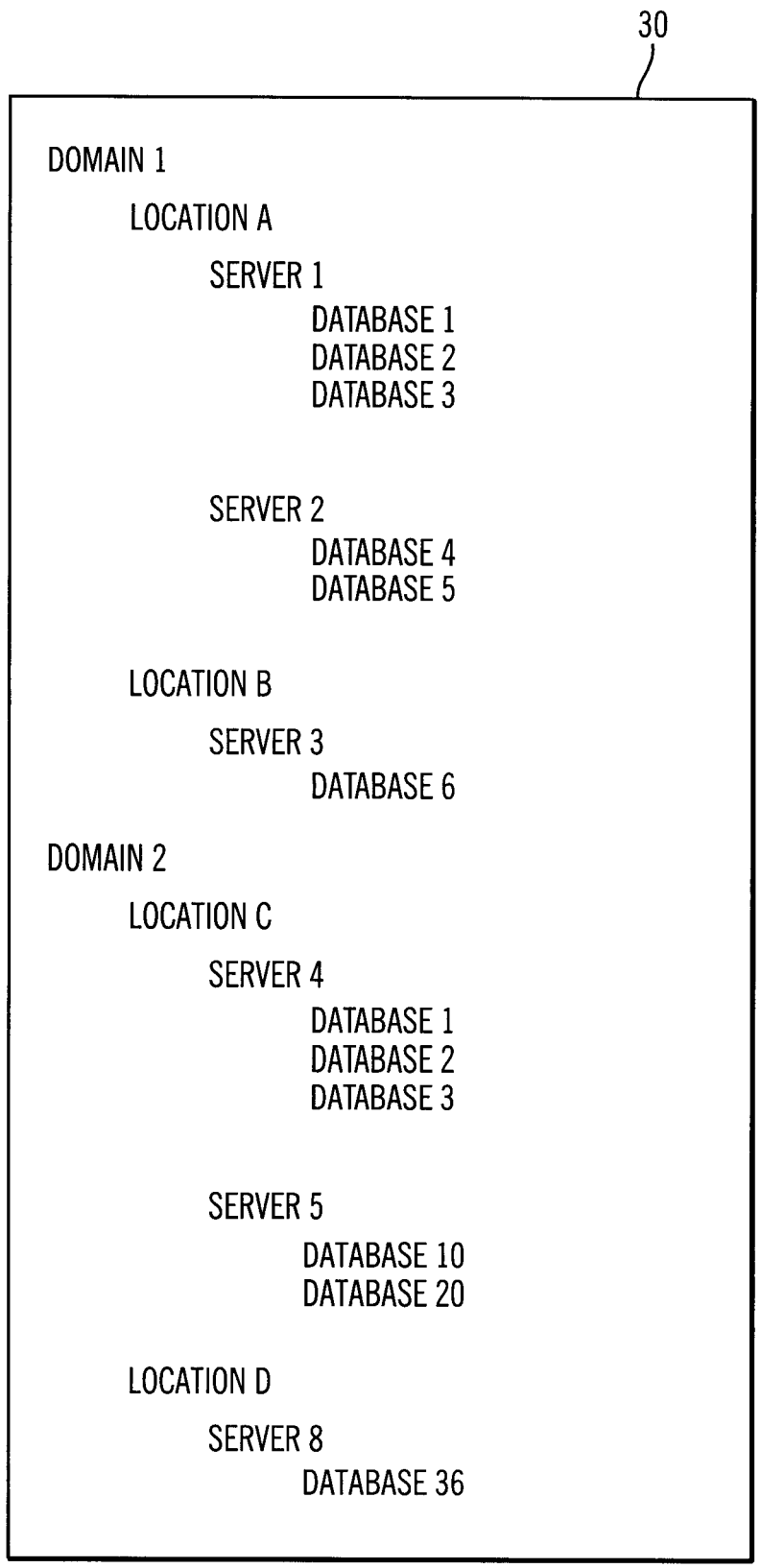
FIG. 2 illustrates a look-up table of available databases and servers in the system at different locations in accordance with preferred embodiments of the present invention.

The Domains, Locations, Data Servers, and Database fields provide the information the client 8 needs to access an alternative, more proximate, replica server, e.g., server 6, including the document 18. These fields form a table or association of domains to locations, domains to data servers, and databases to servers. FIG. 2 illustrates a look-up table 30 that may be formed from the data in these fields. As can be seen, in look-up table 30, server 4 in Location C in Domain 2, includes replicas of the databases 1, 2, and 3 also maintained in Server 1 at Location A.

The Default Domain, Default Data Server, and Default Database fields indicate the location of the master data for the database from which replicas are derived. This location may be different than the location specified in the Document Server, Document Database, and Document ID if the link was created from a server other than the default server including the master database.

When creating a message or document 14 including the link 16, a member in the network 10, i.e., a client or server, would include a graphical element link and information on the location of the document 18 subject to the link in the Document Server, Document Database, and Document ID fields included in the message or document 14. The creator of the message would also include information on alternate servers 6 in the Domains, Locations, Data Servers, and Database fields of the message/document 14. In this way, information on alternative locations of the database 12*a* is embedded within the document 14 including the link 16. In the Lotus Notes environment, these fields would be included in the fields of a Lotus Notes form, and not displayed. In the HTML environment, the information on alternate locations of the database 12*a* would be embedded in the HTML document and accessed by the HTML browser to determine an alternate location from which to access the document.

Figure 3A:
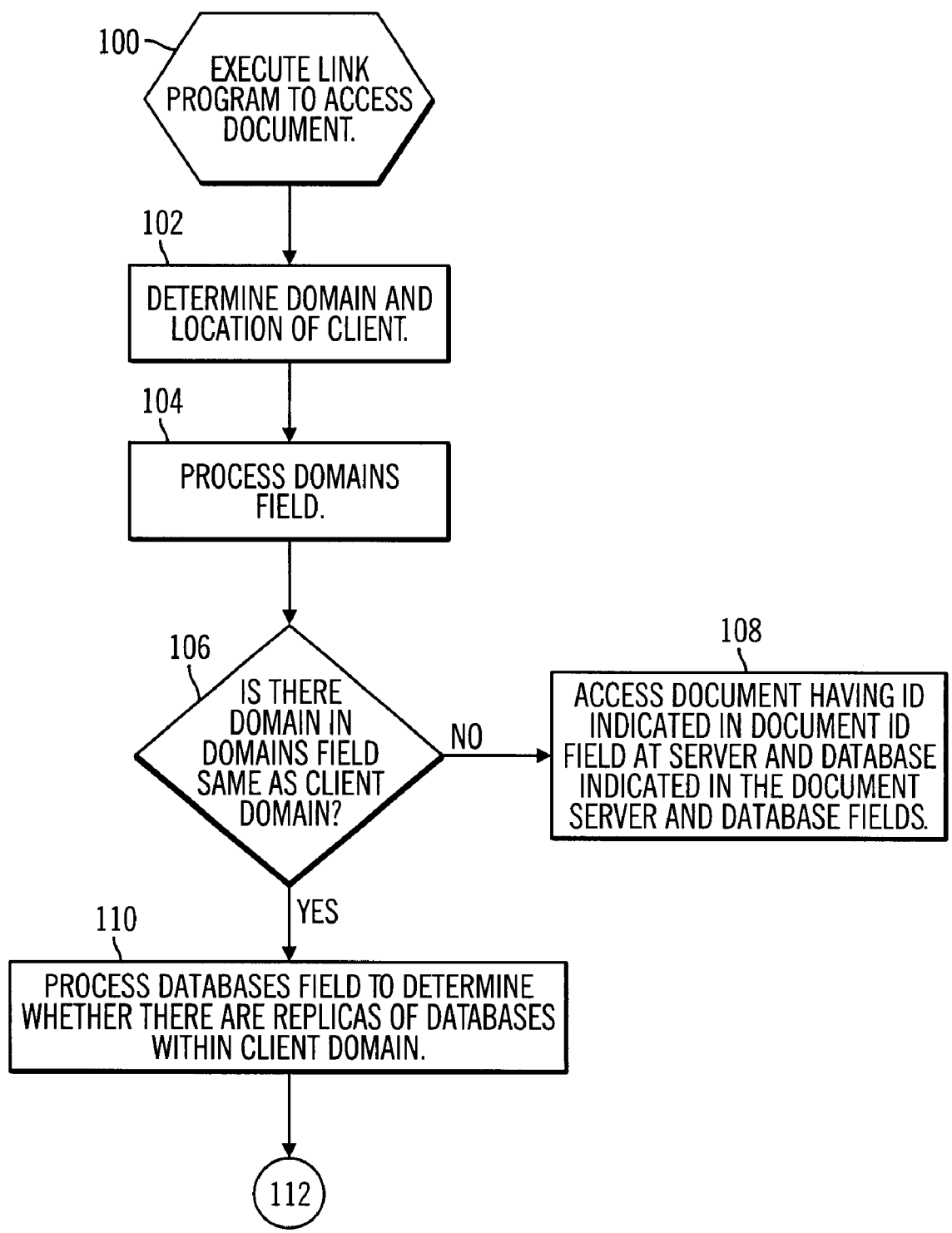
FIGS. 3a, b illustrates logic to use a link to access a document in a network computing environment in accordance with the present invention are implemented.
Figure 3B:
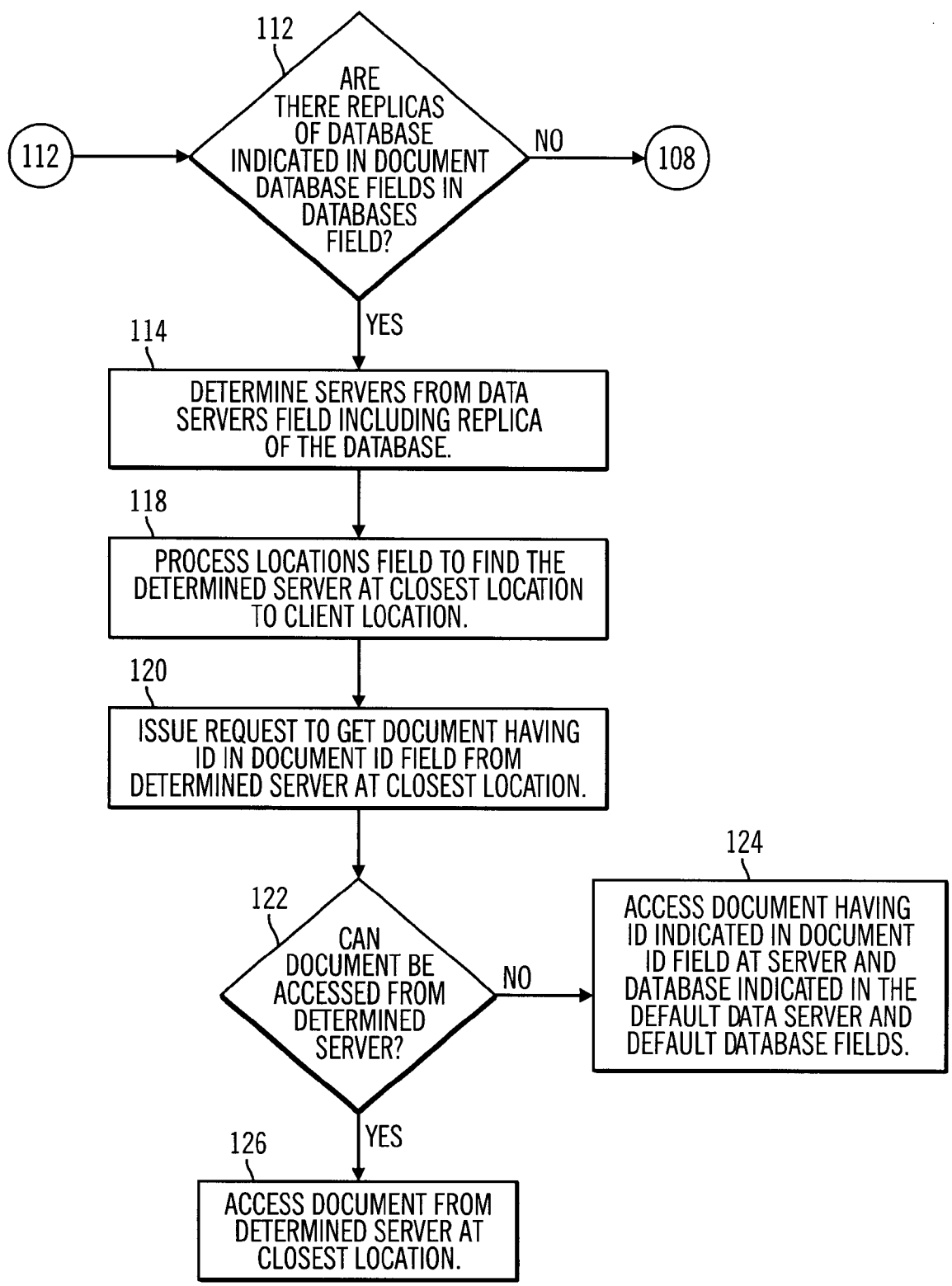

Preferred embodiments include a link program resident in software within the client 8 to process the information in the above fields to access the file or data from the location used to create the link or from a more proximate location containing a replica of the linked-to data. This link program may be provided as a component with the program that processes the document including the link, such as the HTML browser, Lotus Notes, etc. As discusses, the document 14 would include a graphical representation of the link, which may be a push button or other display mechanism, to cause the client 8 to execute the link program to retrieve the linked-to document 18. Execution of the program link would initiate the logic illustrated in FIGS. 3*a, b*, beginning at block 100. The link program determines (at block 102) the domain and location of the client 8 from which the link 16 was executed. This information may be determined from the mail domain used by the client 8. The link program then processes (at block 104) the Domains field, indicating available domains in the network 10, to determine (at block 106) whether there is a domain in the Domains field that is the same domain as the client 8. If not, the link program accesses (at block 108) the document having the ID indicated in the Document ID field at the server and database indicated in the Document Server and Database fields. At block 108, the link program accesses the document at the location of the document used to create the link. In this way, if there is no domain in the Domain field matching the client 8 domain, the link program uses the initially provided address of the link.

If there is a domain in the Domain field that matches the client 8 domain, then the link program processes (at block 110) the Database Field to determine (at block 112) whether there are identical databases including the database indicated in the Document Database field. The link program may determine replicas by determining (at block 112) whether any of the databases in the Database field have the same replica ID as the database indicated in the Document Database field. The replica ID is a property associated with the database. If there are no replicas, then control transfers to block 108 to access the document at the initial location for which the link was created, indicated in the Document Server and Database fields.

If there is a domain in the Domain field that matches the client 8 domain, then the link program processes (at block 114) the Data Servers field to determine servers that include a replica of the database indicated in the Document Database field. For those determined servers, the link program then processes (at block 118) the Locations field to find the determined server that is at the closest location to the client 8, e.g., server 6, which is different from the server 4 including the document that the link 16 addresses. This may be determined by first determining whether there is a server at the same location; if not, then programing methods known in the art may be used to determine the closest of any non-identical locations. After determining the most proximate server, the link program issues (at block 120) a request to retrieve the document 18 from the determined server 6 and replicated database 12*b* therein having the ID indicated in the Document ID field. If the document 18 cannot be accessed from the determined most proximate server, then the link program accesses (at block 124) the document 18 having the document field from the server and database indicated in the Default Data Server and Default Database fields respectively. In this way, if the determined closest replica database is unavailable, then the link program accesses the document from the master copy. Otherwise, if the document 18 can be accessed from the most proximate replica, then the document 18 is accessed (at block 126) from such proximate server 6 and replica database 12*b*.

With preferred embodiments, information is embedded within the document including the link, or embedded object, indicating alternative, more proximate locations that may include the document addressed by the link. For instance, if the client 8 and server 6 are located in Tokyo, Japan and the server 4 including the document 18 addressed by the link 16 are in Los Angeles, Calif., then the link program, using the information embedded in the document 14, would determine to access a copy of the document 18 from the local server 6 in Japan. In this way, the same link provides access to the most proximate, local version of the document, even if the link addresses the document at a distant location. For instance, HTML pages may be embedded with the information on different servers, and such information could be used to reroute a request initiated from user selection of a displayed hypertext link to a URL location to a more proximate URL location that contains a copy or replica of the requested document. In the Lotus Notes system, the information on different servers may be embedded in fields in an e-mail message or other Lotus Notes form, and then used to reroute a selection of a doculink addressing the document at a specific location to a more proximate location including a copy or replica of the requested document. With the preferred embodiments, users can access local database replicas of information by selecting the link that addresses the document at a more distant location.

The preferred embodiments will become especially useful as distributed computing paradigms and models are adopted in modern business processes, which often require replication of data throughout the world. Preferred embodiments, automatically and seamlessly router users of such distributed systems to the closest instance of the requested information in a transparent manner.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as including information fields in the document providing the link which are processed to allow a program to access the linked-to document at the most proximate server in the domain. In further embodiments, these fields may be maintained in any data structure format known in the art, such as tables, trees, etc., to represent available and alternate domains, servers, and databases from which the linked-to file may be accessed.

Preferred embodiments were described with respect to a graphical representation of a hypertext link. However, in further embodiments, the link may not be a hypertext link, but a link that is not displayed and/or automatically accessed when the document is opened or read.

Preferred embodiments described the information needed to access alternative locations as embedded or overloaded into HTML and Lotus Notes type documents. However, such information may be included as an attribute of any document type accessed over a network from a remote location. Such information added to the document is available for execution by local programs when the user selects, e.g., clicks, the hypertext link.

Preferred embodiments were described with respect to Lotus Notes or HTML documents or messages including an embedded link to another document on a server in the system. However, the document may be in alternative file formats, such as Dynamic Hypertext Mark-Up Language (DHTML), the Extensible Markup Language (XML), Cascading Sytle Sheets, any other Standard Generalized Markup Language (SGML), or any document format known in the art.

Preferred embodiments were described with respect to a network environment in which the linked documents are provided to a client from a server over a network, such as the Internet or Intranet. However, in alternative embodiments the linked-to document and replica copies of the document may be maintained within storage devices managed by a single computing device, such as a hard disk drive and removable storage device managed by the single computer. In such case, the request for the document may be rerouted to a storage device having a higher data transfer rate than the storage device including the document addressed by the hypertext link, wherein all storage devices are managed by the same computer.

In summary, the present invention provides a system, method, and program for linking to data from a document that includes a pointer to the data in a first storage device. A first request to access the data addressed by the pointer in the document is processed. Information on alternate storage devices and data therein is processed to determine whether a copy of the data is present in a second storage device. A second request is submitted to access the copy of the data in the second storage device after determining that the information indicates that the second storage device includes the data. The accessed copy of the data, received in response to the second request, is then returned to the first request.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

WINDOWS is registered trademarks of Microsoft Corporation; OS/2, NETFINITY, AS/400, and RS/6000 are registered trademarks of International Business Machines Corporation; LOTUS DOMINO is a trademark and LOTUS NOTES is a registered trademark of the Lotus Development Corporation.

What is claimed is:

1. A method for linking to data from a document including a pointer to the data in a first storage device, comprising:

processing a first request to access the data addressed by the pointer to data in the first storage device in the document;

processing information on locations of alternate storage devices and data therein to determine whether a copy of the data in the first storage device is present in a second storage device, wherein the information on locations of the alternate storage devices and the data therein is embedded within the document and wherein the determination is performed using the information on locations of the alternate storage devices in the document;

submitting a second request to access the copy of the data in the second storage device after determining that the information on locations of alternate storage devices and the data therein indicates that the second storage device includes the copy of the data; and returning the accessed copy of the data, received in response to the second request, to the first request.

2. The method of claim 1, further comprising:

submitting a third request to access the data addressed by the pointer in the document from the first storage device after determining that the information does not indicate that the second storage device includes the copy of the data; and returning the data, received in response to the third request, to the first request.

3. The method of claim 1, further comprising opening the document, wherein processing the information and submitting the first and second requests occur after the document is opened.

4. The method of claim 3, further comprising:

displaying the document and a user selectable graphical representation of the pointer to the data in the opened document; and generating the first request in response to user selection of the graphical representation of the pointer to the data.

5. The method of claim 1, wherein the document is accessible through a first computer controlling access to the first storage device, wherein the alternate storage devices are accessible from alternate computers over a network, wherein the information on the locations of alternate storage devices comprises information on the network addresses of the alternate computers that control access to the alternate storage devices, and wherein determining the second storage device comprises determining the network address of a second computer controlling access to the second storage device.

6. A method for linking to data in a network computing environment from a document in a first computer, wherein the document includes a pointer to the data at a second computer, comprising:

processing a first request at the first computer to access the data addressed by the pointer in the document;

processing information at the first computer on locations of alternate computers and data therein to determine whether a copy of the data is present in a third computer, wherein the first, second, and third computers communicate over a network, and wherein the information on locations of alternate computers and data is embedded within the document containing the pointer;

submitting a second request from the first computer to access the copy of the data in the third computer after determining that the information on locations of alternate computers and data indicates that the third computer includes the copy of the data; and returning the accessed copy of the data, received in response to the second request, to the first request.

7. The method of claim 6, further comprising:

submitting a third request to the second computer for the data addressed by the pointer after determining that there is no copy of the data at the third computer; and returning the data, received in response to the third request, to the first request.

8. The method of claim 6, further comprising:

opening the document;

displaying the document and a user selectable graphical representation of the pointer to the data in the opened document; and generating the first request in response to user selection of the graphical representation of the pointer to the data.

9. The method of claim 6, wherein the data is included in a database, wherein the information on locations of alternate computers and data therein indicates different domains, servers included in each domain, and at least one database included in each server, wherein processing the information to determine whether the copy of the data is accessible through the third computer comprises:

determining a domain indicated in the information having the same domain as the first computer; and determining one server in the determined domain that includes a copy of the database including the copy of the data addressed by the pointer in the document, wherein submitting the second request to the third computer comprises submitting the second request to the determined server including the copy of the database.

10. The method of claim 9, wherein the information on locations of alternate computers indicates a location of each server, wherein determining one server further comprises:

determining servers including the copy of the database;

determining the location of each of the determined servers;

determining whether the location of one determined server has the same location as the first computer; and selecting the server having the same location as the first computer after determining that one sever has the same location as the first computer, wherein the second request is submitted to the selected server.

11. The method of claim 10, further comprising:

determining one server from the determined servers having a location most proximate to the first computer after determining that none of the determined servers have the same location as the first computer; and selecting the server having the most proximate location to the first computer after determining the server having the most proximate location, wherein the second request is submitted to the selected server.

12. A system for linking to data from a document including a pointer to the data in a first storage device, comprising:

a computer;

a memory accessible to the computer including the document;

program logic executed by the computer, comprising:

(i) means for processing a first request to access the data addressed by the pointer to the data in the first storage device in the document;

(ii) means for processing information on locations of alternate storage devices and data therein to determine whether a copy of the data in the first storage device is present in a second storage device, wherein the information on locations of alternate storage devices and the data therein is embedded within the document and wherein the determination is performed using the information on locations of the alternate storage devices in the document;

(iii) means for submitting a second request to access the copy of the data in the second storage device after determining that the information on locations of alternate storage devices and the data therein indicates that the second storage device includes the copy of the data; and (iv) means for returning the accessed copy of the data, received in response to the second request, to the first request.

13. The system of claim 12, wherein the program logic further comprises:

means for submitting a third request to access the data addressed by the pointer in the document from the first storage device after determining that the information does not indicate that the second storage device includes the copy of the data; and means for returning the data, received in response to the third request, to the first request.

14. The system of claim 12, wherein the program logic further comprises means for opening the document, wherein processing the information and submitting the first and second requests occur after the document is opened.

15. The system of claim 14, wherein the program logic further comprises:

means for displaying the document and a user selectable graphical representation of the pointer to the data in the opened document; and a means for generating the first request in response to user selection of the graphical representation of the pointer to the data.

16. The system of claim 12, wherein the document is accessible through a first computer controlling access to the first storage device, wherein the alternate storage devices are accessible from alternate computers over a network, wherein the information on the locations of alternate storage devices comprises information on the network addresses of the alternate computers that control access to the alternate storage devices, and wherein determining the second storage device comprises determining the network address of a second computer controlling access to the second storage device.

17. A system for linking to data in a network computing environment comprising multiple computers, comprising:

a first computer;

a memory accessible to the first computer including a document, wherein the document includes a pointer to the data at a second computer;

a network accessible to the first computer, providing communication with a second and third computers in the network;

program logic executed by the first computer, comprising:

(i) means for processing a first request to access the data addressed by the pointer in the document;

(ii) means for processing information on locations of alternate computers and data therein to determine whether a copy of the data is present in a third computer, and wherein the information on locations of alternate computers and data is embedded within the document containing the pointer;

(iii) means for submitting a second request to access the copy of the data in the third computer after determining that the information on locations of alternate computers and data indicates that the third computer includes the copy of the data; and (iv) means for returning the accessed copy of the data, received in response to the second request, to the first request.

18. The system of claim 17, wherein the program logic further comprises:

means for submitting a third request to the second computer for the data addressed by the pointer after determining that there is no copy of the data at the third computer; and means for returning the data, received in response to the third request, to the first request.

19. The system of claim 17, wherein the program logic further comprises:

means for opening the document;

means for displaying the document and a user selectable graphical representation of the pointer to the data in the opened document; and means for generating the first request in response to user selection of the graphical representation of the pointer to the data.

20. The system of claim 17, wherein the data is included in a database, wherein the information on locations of alternate computers and data therein indicates different domains, servers included in each domain, and at least one database included in each server, wherein the program logic for processing the information to determine whether the copy of the data is accessible through the third computer comprises:

means for determining a domain indicated in the information having the same domain as the first computer; and means for determining one server in the determined domain that includes a copy of the database including the copy of the data addressed by the pointer in the document, wherein submitting the second request to the third computer comprises submitting the second request to the determined server including the copy of the database.

21. The system of claim 20, wherein the information on locations of alternate computers indicates a location of each server, wherein the program logic for determining one servers further comprises:

means for determining servers including the copy of the database;

means for determining the location of each of the determined servers;

means for determining whether the location of one determined server has the same location as the first computer; and means for selecting the server having the same location as the first computer after determining that one sever has the same location as the first computer, wherein the second request is submitted to the selected server.

22. The system of claim 21, wherein the program logic further comprises:

means for determining one server from the determined servers having a location most proximate to the first computer after determining that none of the determined servers have the same location as the first computer; and means for selecting the server having the most proximate location to the first computer after determining the server having the most proximate location, wherein the second request is submitted to the selected server.

23. An article of manufacture for linking to data from a document including a pointer to the data in a first storage device, the article of manufacture comprising a computer usable media including at least one computer program embedded therein that is capable of causing the computer to perform:

processing a first request to access the data addressed by the pointer to the data in the first storage device in the document;

processing information on locations of alternate storage devices and data therein to determine whether a copy of the data in the first storage device is present in a second storage device, wherein the information on locations of alternate storage devices and the data therein is embedded within the document and wherein the determination is performed using the information on locations of the alternate storage devices in the document;

submitting a second request to access the copy of the data in the second storage device after determining that the information on locations of alternate storage devices and the data therein indicates that the second storage device includes the copy of the data; and returning the accessed copy of the data, received in response to the second request, to the first request.

24. The article of manufacture of claim 23, further comprising:

submitting a third request to access the data addressed by the pointer in the document from the first storage device after determining that the information does not indicate that the second storage device includes the copy of the data; and returning the data, received in response to the third request, to the first request.

25. The article of manufacture of claim 23, further comprising opening the document, wherein processing the information and submitting the first and second requests occur after the document is opened.

26. The article of manufacture of claim 25, further comprising:

displaying the document and a user selectable graphical representation of the pointer to the data in the opened document; and generating the first request in response to user selection of the graphical representation of the pointer to the data.

27. The article of manufacture of claim 23, wherein the document is accessible through a first computer controlling access to the first storage device, wherein the alternate storage devices are accessible from alternate computers over a network, wherein the information on the locations of alternate storage devices comprises information on the network addresses of the alternate computers that control access to the alternate storage devices, and wherein determining the second storage device comprises determining the network address of a second computer controlling access to the second storage device.

28. An article of manufacture for linking to data in a network computing environment from a document in a first computer, wherein the document includes a pointer to the data at a second computer, the article of manufacture comprising a computer usable media including at least one computer program embedded therein that is capable of causing the computer to perform:

processing a first request at the first computer to access the data addressed by the pointer in the document;

processing information at the first computer on locations of alternate computers and data therein to determine whether a copy of the data is present in a third computer, wherein the first, second, and third computers communicate over a network, and wherein the information on locations of alternate computers and data is embedded within the document containing the pointer;

submitting a second request from the first computer to access the copy of the data in the third computer after determining that the information on locations of alternate computers and data indicates that the third computer includes the copy of the data; and returning the accessed copy of the data, received in response to the second request, to the first request.

29. The article of manufacture of claim 28, further comprising:

submitting a third request to the second computer for the data addressed by the pointer after determining that there is no copy of the data at the third computer; and returning the data, received in response to the third request, to the first request.

30. The article of manufacture of claim 28, further comprising:

opening the document;

displaying the document and a user selectable graphical representation of the pointer to the data in the opened document; and generating the first request in response to user selection of the graphical representation of the pointer to the data.

31. The article of manufacture of claim 28, wherein the data is included in a database, wherein the information on locations of alternate computers and data therein indicates different domains, servers included in each domain, and at least one database included in each server, wherein processing the information to determine whether the copy of the data is accessible through the third computer comprises:

determining a domain indicated in the information having the same domain as the first computer; and determining one server in the determined domain that includes a copy of the database including the copy of the data addressed by the pointer in the document, wherein submitting the second request to the third computer comprises submitting the second request to the determined server including the copy of the database.

32. The article of manufacture of claim 31, wherein the information on locations of alternate computers indicates a location of each server, wherein determining one server further comprises:

determining servers including the copy of the database;

determining the location of each of the determined servers;

determining whether the location of one determined server has the same location as the first computer; and selecting the server having the same location as the first computer after determining that one sever has the same location as the first computer, wherein the second request is submitted to the selected server.

33. The article of manufacture of claim 32, further comprising:
   determining one server from the determined servers having a location most proximate to the fist computer after determining that none of the determined servers have the same location as the first computer; and
   selecting the server having the most proximate location to the first computer after determining the server having the most proximate location, wherein the second request is submitted to the selected server.

* * * * *